United States Patent Office 3,079,312
Patented Feb. 26, 1963

3,079,312
SHAPED POLYMERIC ARTICLES
Clarence M. Alsys, Wilmington, Del., assignor to E. I.
du Pont de Nemours and Company, Wilmington, Del.,
a corporation of Delaware
No Drawing. Filed Nov. 6, 1956, Ser. No. 620,589
10 Claims. (Cl. 204—154)

This invention relates to shaped organic polymeric articles and particularly to a process of increasing the tensile strength and decreasing the weight loss thereof at elevated temperatures.

Sheets or films, moldings, castings and similar shaped organic polymeric articles are used under high temperature conditions where tensile strength and/or resistance to weight loss are important. Examples are bowls, bottles, bearing inserts, valve components, wheels, stuffing box components, electric motor slot liners, and tubular electrical insulation.

The object of this invention is to improve the high temperature tensile strength and/or resistance to weight loss at high temperatures of shaped articles made from mono-olefinic hydrocarbon polymers such as polyethylene or polypropylene. Other properties can simultaneously be improved, such as percent elongation before breaking under tension at room temperature or at high temperatures.

I have found that the properties of shaped articles made from these mono-olefinic hydrocarbon polymers can be improved by a combination of two modifications; namely, an additive plus irradiation with high-energy (of the order of 0.2–20 mev.) ionizing radiation. In more detail, my invention is the process of preparing a shaped polymeric article which comprises (1) preparing an intimate mixture of (a) at least one mono-olefinic hydrocarbon polymer of the class consisting of polyethylene and polypropylene and (b) at least one organic compound having a boiling point above 75° C. and being a member of the class consisting of hydrocarbons containing a plurality of halogen substituents, compounds containing a plurality of carbonyl groups, and compounds containing one carbonyl group and one $CH_2=C<$ group, (2) preparing a shaped article from said mixture, and (3) irradiating said shaped article with ionizing radiation of the class consisting of accelerated electrons, gamma rays and X-rays, employing a radiation dose of at least $36 \times 10^5$ rads.

A "rad" is a convenient term for expressing radiation dosage or the amount of energy absorbed by a material as a result of exposure to ionizing radiation. One rad is the amount of ionizing radiation absorbed during the deposition of 100 ergs ($10^{-5}$ watt second) of energy in one gram of the material irradiated.

The principal mono-olefinic hydrocarbon polymers useful in this invention are homopolymers of ethylene and propylene, respectively, although also included are copolymers thereof with a small amount of one or more olefinically unsaturated hydrocarbons copolymerizable therewith, which amount is insufficient to detract materially from the fundamental properties of the homopolymer. Polyethylene is the preferred species of mono-olefinic hydrocarbon polymer because it is more readily available and yields especially useful and tough shaped articles.

The added organic compounds should have a boiling point above about 75° C. to minimize loss by evaporation during the processes of this invention.

Examples of the first class of added organic compounds having a boiling point above 75° C., which are hydrocarbons containing a plurality of halogen substituents, are homopolymers and copolymers of vinyl chloride, vinylidene chloride, vinyl fluoride and vinylidene fluoride. Examples of the second class of added organic compounds, which contain a plurality of carbonyl

groups, are polyvinyl acetate, polymethyl methacrylate, polyvinyl acetal resins derived from incompletely hydrolyzed polyvinyl acetate reacted with an aldehyde, glyceryl phthalate, glyceryl-glycol terephthalate, other polyester reaction products of polyhydric alcohols and polybasic acids such as a vegetable oil modified phthalic glyceride alkyd resin. Examples of the third class of added organic compounds, which contain one carbonyl group and one $CH_2=C<$ group, are methacrylyl chloride, acrylyl chloride, methacrylic acid, acrylic acid, methacrylamide, and glycidyl methacrylate. It is believed that the compounds in this class polymerize to some extent during the process of this invention and thus, in effect, function as members of the classes previously described. Polyvinyl fluoride, polyesters, and methacrylic acid are preferred compounds of their respective classes for use in modifying the olefin hydrocarbon polymers before irradiation.

The preferred proportions of polymer to added organic compound are in the range of 95:5 to 60:40 by weight, respectively. A more restricted range of preferred proportions is 90:10 to 70:30, respectively.

The practice of this invention involves three essential steps: (1) preparing an intimate mixture of mono-olefinic hydrocarbon polymer and added organic compound, (2) preparing a shaped article from the mixture and (3) irradiating the shaped article. Step 1, mixture preparation, can be practiced by employing such processes as (a) milling the mixture on a rubber mill, in a ball mill or in a mixer, (b) melting the components of the mixture to form a uniform fluid melt, (c) dissolving the components of the mixture in a mutual solvent, followed, if desirable, by evaporating all or part of the solvent, (d) dissolving the components of the mixture in a mutual solvent, coprecipitating the mixture therefrom, separating the coprecipitate from the bulk of the precipitating medium, followed, if desirable, by evaporating all or part of the residual precipitating medium, (e) codispersing the components of the mixture in a non-solvent liquid such as by ball-milling, separating the codispersed components from the bulk of the non-solvent, followed, if desirable, by evaporating all or part of the residual non-solvent, or (f) a combination of these or similar techniques.

Step 2, shaping, can be practiced by calendering, extruding, pressing, molding, casting or otherwise shaping the mixture into rods, tubes, thick sheets, thin films or irregularly shaped solids, like dishes and bottles.

In step 3, the required ionizing radiation can be supplied from any of the well-known sources. Examples are the electro-mechanical devices for producing high velocity particles such as a Van de Graaff generator, a resonant transformer, a cyclotron, a betatron, a synchrotron, a synchrocyclotron, or a linear accelerator, X-ray tubes, and radioactive isotopes emitting beta particles (high-velocity electrons) and/or gamma rays. One of the most convenient sources of ionizing radiation for industrial practice of this invention is a Van de Graaff generator. A particularly convenient arrangement involves adjusting the generator to provide a beam of 2 mev. electrons at about 250 microamperes intensity. To do this a vacuum of the order of $10^{-6}$ mm. Hg is required. The beam is shaped by a deflector coil so that at 20 centimeters below the window it is approximately 4 cm. x 20 cm. in cross section and provides a dose of about $6 \times 10^5$ rads per second in polymeric material of the type used in this invention. A convenient method of irradiation is to place the shaped article on a mechanically movable table which is passed under the beam in the direction of its short dimension at a rate of 2 cm. per sec. Thus one pass through the beam takes 2 seconds and provides a dose of about $12 \times 10^5$ rads.

While a high-velocity electron beam from a Van de Graaff generator, as described, is the preferred form of the ionizing radiation required in this invention, other sources of high-velocity electrons or of X-rays, beta particles, or gamma rays can be used. As those skilled in the art of radiation will appreciate, several factors are involved in substituting one kind of radiation for another. But, knowing the amount of radiation (expressed as rads) required to be absorbed by the irradiated material and its absorption coefficient, the irradiation geometry of a system and the duration of irradiation can be calculated for an available source yielding radiation having a characteristic energy level and intensity.

With respect to improving the tensile strength and resistance to weight loss of shaped polymeric articles as described and claimed herein, equivalent results are obtained with any of the types of ionizing radiation previously defined, provided that the amount of irradiation is at least $36 \times 10^5$ rads and does not exceed an amount which decomposes, chars or otherwise impairs the integrity of the shaped article irradiated. I have found that, in general, the shaped articles should not be irradiated beyond a level of the order of $720 \times 10^5$ rads. A preferred level is about $120 \times 10^5$ to $400 \times 10^5$ rads.

The following examples are provided to illustrate the principles and practice of this invention, but its scope is not intended to be limited thereby. Unless otherwise specified, the parts and percentages are expressed by weight.

*Example 1*

70 parts of polyethylene ("Alathon" 10, sold by E. I. du Pont de Nemours and Co.), and 30 parts of glacial methacrylic acid are milled on a two-roll rubber mill for about 15 minutes at 160°–170° C., whereby a uniform mixture is obtained. The mixed product is sheeted out as a flat mass about 0.2 inch thick. A piece of this sheet is placed between 2 sheets of aluminum foil, and the resulting assembly is pressed for about 1 minute in a flat plate Carver press at 150° C. and 19,000 pounds per square inch pressure. The resulting continuous sheet about 0.01 inch thick is stripped from the aluminum foil and is retained for irradiation.

A sheet of polyethylene ("Alathon" 10) containing no additive (no methacrylic acid) is prepared in a similar manner. It is cut in half. One half is retained as a control, the other for irradiation.

The methacrylic acid-modified polyethylene sheet and one half of the unmodified polyethylene sheet are irradiated by passing them 30 times at room temperature through the Van de Graaff beam previously specifically described. Each pass providing a dose of about $12 \times 10^5$ rads, the total dose for each sheet is about $360 \times 10^5$ rads.

The resulting irradiated sheets and the control are tested for tensile strength at a high temperature by cutting from each a small rectangular piece measuring 0.75 inch by 0.25 inch. Spring clips are attached to opposite ends of the long dimension of these pieces so that the strips can be hung separately. Weight is added to the bottom clip to provide a 10 gram load total. These assemblies are hung in a circulating hot air oven at 250° C., and the time is recorded.

In less than one minute, the unirradiated unmodified polyethylene strip breaks. The irradiated unmodified polyethylene strip breaks in 10 minutes. The irradiated methacrylic acid-modified polyethylene strip which illustrates this invention lasts 166 minutes before breaking.

The significance of these results is that the product of this invention withstands tension at a high temperature 16–160 times longer than prior art products. In practical service under such conditions, as in the insulation of electrical components, the products of this invention are considerably more useful than prior art products.

A similar improvement in tensile strength at high temperatures is obtained by substituting in this example a substantially equal dose of radiation from X-ray and gamma ray sources for the Van de Graaff electrons.

Other organic compounds of the class which contain one carbonyl group and one $CH_2=C<$ group, e.g. methacrylyl chloride, acrylyl chloride, acrylic acid, methacrylamide, and glycidyl methacrylate provide substantial improvements in tensile strength when substituted for methacrylic acid and used in the manner described in this example.

As few as 3 passes ($36 \times 10^5$ rads) yield a useful improvement in tensile strength at high temperatures. More than about 60 passes ($720 \times 10^5$ rads) do not produce a further improvement and tend to cause charring and/or decomposition of the product.

*Example 2*

Test strips of unmodified polyethylene and of polyethylene/methacrylic acid mixtures in the proportions 75/25, 80/20 and 85/15 respectively are prepared as in Example 1, the number of passes for irradiation being 10 (total dose $120 \times 10^5$ rads). These strips, along with an unirradiated unmodified polyethylene control, are aged for 24 hours in a hot air oven at 200° C. and are then tested at room temperature, about 25° C., for tensile strength and percent elongation at the breaking point.

The results are tabulated below:

|  | Tensile Strength (p.s.i.) | Percent Elongation at Break |
|---|---|---|
| Polyethylene (unirradiated control) | 375 | 23 |
| Polyethylene | (¹) | (¹) |
| Polyethylene/methacrylic acid 75/25 | 1,155 | 99 |
| Polyethylene/methacrylic acid 80/20 | 1,045 | 732 |
| Polyethylene/methacrylic acid 85/15 | 1,546 | 534 |

¹ Too brittle to test.

The improvement shown in these results is useful in all practical applications of mono-olefinic hydrocarbon polymers where tensile strength and ability to stretch are primary requisites.

Dishes, mixing bowls, bottles and tubing made from polyethylene/methacrylic acid mixtures and irradiated as described in this example have considerably more strength than similar prior art articles and are therefore more useful under a wide range of service conditions.

Example 3

Sheets of unmodified polyethylene and of a 75/25 polyethylene/methacrylic acid are prepared as in Example 1, in duplicate. They are irradiated by passing them 20 times through the previously described Van de Graaff beam. Then they are weighed accurately and are hung separately in a circulating hot air oven at 200° C., the first set for 24 hours and the duplicate set for 48 hours. They are finally weighed accurately again to determine the percentage of the original weight lost by prolonged exposure to an elevated temperature. The results are as follows:

|  | Percent of Original Weight Lost | |
| --- | --- | --- |
|  | 24 Hours | 48 Hours |
| Polyethylene control | 15.8 | 34.2 |
| Polyethylene/methacrylic acid 75/25 | 1.1 | 1.8 |

For many practical purposes, such as insulating electric motors which operate substantially continuously, this reduction in weight loss is an extremely useful property of the products of this invention.

Example 4

A mixture of 80 parts of polyethylene and 20 parts of polyvinyl chloride ("Geon" 121) is worked up into sheet form as in Example 1. One-half of the resulting sheet is irradiated by passing it 20 times through the previously described Van de Graaff beam (total dose $240 \times 10^5$ rads). Test strips (0.75 inch x 0.25 inch) are cut from the unirradiated and the irradiated halves and are tested for tensile strength at high temperatures by hanging them, under a 10 gram tension load as in Example 1, in a cold oven, raising the temperature of the oven gradually (e.g. 2°–3° per minute), and determining the temperature at which each strip breaks. The unirradiated strip breaks at 120° C., and the irradiated strip at 266° C., thus demonstrating a considerable advantage in high temperature tensile strength for the irradiated product of this invention.

Example 5

A mixture of 80 parts of polyethylene, 20 parts of polyvinyl fluoride and 2 parts of dibetanaphthyl-paraphenylenediamine antioxidant is worked up into sheet form as in Example 1. The resulting sheet is cut in half, one half remaining unirradiated. The other half is irradiated by passing it 15 times through the previously described Van de Graaff beam (total dose $180 \times 10^5$ rads).

Test strips are cut from the resulting irradiated sheet and the unirradiated sheet and are tested for tensile strength at high temperature as in Example 1.

In less than one minute, the unirradiated strip breaks. The irradiated strip, which illustrates this invention lasts 103 minutes before breaking, thus demonstrating the improved high temperature tensile strength claimed in this invention.

Other hydrocarbons which contain a plurality of halogen substituents provide a substantial improvement in tensile strength when used in the manner described in this example, e.g. polymers of vinyl chloride, vinylidene chloride, and vinylidene fluoride.

Example 6

A mixture of 83 parts of polyethylene and 17 parts of alkyd (polyester) resin solids is prepared in sheet form as in Example 1. The alkyd resin is a 54% solution in hydrocarbon solvents of the complex polyester reaction product of dehydrated castor oil, glycerine and phthalic anhydride in such proportions that the resin solids contain 43% of chemically combined oil, the equivalent of 51.7% neutral glyceryl phthalate ester, and unreatcted hydroxyl groups equivalent to 5.3% of unesterified glycerine. The alkyd resin solvent evaporates during milling.

A sheet of polyethylene containing no additive (no polyester resin) is prepared in a similar manner.

Each of these two sheets is cut into thirds. One-third remains unirradiated, one-third is irradiated 20 passes and one-third is irradiated 50 passes through the previously described Van de Graaff beam. The irradiation doses are $240 \times 10^5$ and $600 \times 10^5$ rads respectively.

Test strips 2 inches by 0.25 inch are cut from the resulting irradiated sheets and the unirradiated controls. These strips are hung separately with the long dimension vertical and with a 30 gram load attached at the bottom, in a cold oven. The temperature of the oven is raised gradually (e.g. 2°–3° per minute) and the temperature at which the strip breaks is determined. The percent elongation at the breaking point is also observed. The results are as follows:

|  | Irradiation Dose, rads | Breaking Temperature, ° C. | Percent Elongation at Break |
| --- | --- | --- | --- |
| Polyethylene | 0 | 106 | 25 |
| Polyethylene/polyester 87/13 | 0 | 112 | 90 |
| Polyethylene | $240 \times 10^5$ | 182 | 215 |
| Polyethylene/polyester 87/13 | $240 \times 10^5$ | 145 | 1,233 |
| Polyethylene | $600 \times 10^5$ | 173 | 77 |
| Polyethylene/polyester 87/13 | $600 \times 10^5$ | 220 | 150 |

These results show that the irradiated polyester-modified polyethylene products of this invention have better high temperature tensile strength, or greater elongation at break, or both, than the prior art irradiated unmodified polyethylene products. These improvements are useful in all applications where these properties are primary requisites.

Other compounds containing a plurality of carbonyl groups, as appear in the polyester of this example, provide a substantial improvement in tensile strength and/or elongation when used in the manner described in this example, e.g. polyvinyl acetate, polymethyl methacrylate, polyvinyl butyral derived from incompletely hydrolyzed polyvinyl acetate.

Example 7

40 parts of solid waxy polypropylene, 10 parts of glacial methacrylic acid, and 1 part of ditertiarybutyl peroxide polymerization catalyst are dissolved in 500 parts of xylene by refluxing the mixture for about 15 minutes. It is probable that substantially all of the methacrylic acid is polymerized by this treatment. The hot solution is poured into shallow pans and is freed of substantially all of the xylene by evaporation. The resulting mixture is milled on a two-roll rubber mill for about 15 minutes at 125° C. and is removed as a sheet about 0.03 inch thick. A section of this sheet is pressed to a 10 mil thick film in a Carver press at 150° C. and 5000 p.s.i. for one minute.

A sheet of polypropylene containing no methacrylic acid or ditertiarybutyl peroxide is similarly prepared.

These sheets are irradiated by passing them 10 times through the Van de Graaff beam previously described (total dose $120 \times 10^5$ rads).

Test strips (0.75 inch x 0.25 inch) are cut and tested for tensile strength at high temperatures by hanging them, under a 10 gram tension load as in Example 1, in a cold oven, raising the oven temperature gradually (e.g. 2°–3° per minute), and determining the temperature at which each strip breaks. The irradiated unmodified polypropylene strip breaks at 116° C. and the irradiated methacrylic acid-modified polypropylene strip at 157° C., demonstrating the advantage of high temperature tensile strength for the irradiated methacrylic acid-modified product of this invention.

It will be obvious to those skilled in the art that substances commonly used in shaped polymeric articles can be incorporated in the products of this invention to impart other desirable properties thereto. Examples of such substances are colored pigments or dyes for decorative purposes, inert fillers, antioxidants, catalysts, hardeners, and softeners, provided that such materials are not harmfully affected by, and are not used in amounts which interfere with, the process of this invention.

The shaped polymeric articles of this invention are useful in the form of sheets, films, moldings, castings, extrusions and the like. More specifically, for example, they are useful as mixing bowls, dishes, bottles, tubes, rods, wheels, bearings and bearing inserts, valve components, stuffing box sealing components, and slot liners for electric motors. Such articles and others, are required to have tensile strength at ordinary and at high temperatures. When the article is used for prolonged periods at a high temperature, such as a continuously operating electric motor, resistance to weight loss is also required. The products of this invention fulfill these requirements.

Many widely different embodiments of this invention can be made without departing from the spirit and scope thereof. Therefore it is not intended to be limited except as indicated in the appended claims.

I claim:

1. The process of preparing a shaped article exhibiting dimensional and thermal stability and resistance to oxidative degradation at temperatures up to 250° C. which comprises (1) preparing an intimate mixture of from 60 to 95 parts by weight of (a) at least one of the hydrocarbon polymers selected from the group consisting of polyethylene, polypropylene, and copolymers of ethylene with olefinically-unsaturated hydrocarbons, the olefinically-unsaturated hydrocarbon comonomer being present in the copolymer in a small proportion which is insufficient to detract materially from the fundamental properties of the homopolymer, and a complementary proportion of from 40 to 5 parts by weight of (b) at least one organic compound selected from the group consisting of monomeric methacrylic acid and its esters, monomeric acrylic acid and its esters, polymethylmethacrylate, polymethacrylic acid, alkyd polyester resins, polyvinyl halide, and polyvinylidene halide; (2) preparing a shaped article from said mixture, and (3) irradiating said shaped article with high energy, ionizing radiation for a time sufficient to provide a radiation dose of from $36 \times 10^5$ rads to $720 \times 10^5$ rads.

2. The process of claim 1 in which the polymer (a) and the organic compound (b) are present in proportions in the range of 90:10 to 70:30 by weight, respectively.

3. The process of claim 1 in which the polymer (a) is polyethylene.

4. The process of claim 1 in which the polymer (a) is polypropylene.

5. The process of claim 1 in which the organic compound (b) is methacrylic acid.

6. The process of claim 1 in which the organic compound (b) is polyvinyl fluoride.

7. The process of claim 1 in which the organic compound (b) is polyvinyl chloride.

8. The process of claim 1 in which the ionizing radiation is accelerated electrons.

9. The process of claim 1 in which the radiation dose is in the range of $120 \times 10^5$ to $400 \times 10^5$ rads.

10. A shaped article made according to the process of claim 1 and exhibiting thermal and oxidative stability at temperatures up to 250° C.

References Cited in the file of this patent

UNITED STATES PATENTS

| 2,666,025 | Nozaki | Jan. 12, 1954 |
| 2,863,812 | Graham | Dec. 9, 1958 |

FOREIGN PATENTS

| 66,034 | France | Dec. 12, 1955 |
| | (4th addition to No. 1,079,401) | |
| 1,130,099 | France | Sept. 17, 1956 |
| 1,130,100 | France | Sept. 17, 1956 |
| 582,559 | Great Britain | Nov. 20, 1946 |
| 1,079,401 | France | May 19, 1954 |
| 564,816 | Belgium | Oct. 6, 1956 |

OTHER REFERENCES

Lawton et al.: "Nature," vol. 172, pages 76 and 77, July 11, 1953.

Brookhaven National Laboratory Report No. 367, pages 27 and 28, February 1956.

Brookhaven National Laboratory Report No. 375, page 26, April 1956.

Brookhaven National Laboratory Report No. 414, pages 1–14, October 1956.

"J. Polymer Science," vol. 19, No. 91, pages 219–224, January 1956.

Ballantine "Modern Plastics" pages 171–176, September 1957.

UNITED STATES PATENT OFFICE
CERTIFICATE OF CORRECTION

Patent No. 3,079,312 February 26, 1963

Clarence M. Alsys

It is hereby certified that error appears in the above numbered patent requiring correction and that the said Letters Patent should read as corrected below.

Column 8, line 33, under list of references cited, for "564,816" read -- 546,816 --.

Signed and sealed this 4th day of June 1963.

(SEAL)
Attest:

ERNEST W. SWIDER
Attesting Officer

DAVID L. LADD
Commissioner of Patents